United States Patent [19]
Seymour et al.

[11] Patent Number: 4,565,422
[45] Date of Patent: Jan. 21, 1986

[54] SURFACE PLASMON COUPLER

[75] Inventors: Robert J. Seymour, Wellesley Hills, Mass.; George I. Stegeman, Tucson, Ariz.

[73] Assignee: GTE Laboratories Incorporated, Waltham, Mass.

[21] Appl. No.: 556,862

[22] Filed: Nov. 30, 1983

[51] Int. Cl.$^4$ ................................................ G02B 5/04
[52] U.S. Cl. .................................. 350/96.19; 350/1.1; 350/320
[58] Field of Search ...................... 350/96.19, 1.1, 286, 350/320

[56] References Cited

U.S. PATENT DOCUMENTS 3,610,727 10/1971 Ulrich ............................. 350/96.19

FOREIGN PATENT DOCUMENTS 2258215 5/1974 Fed. Rep. of Germany ... 350/96.19

OTHER PUBLICATIONS

Chabal et al., "Surface Electromagnetic Wave Launching at the Edge of a Metal Film", *Appl. Phys. Lett.*, vol. 32, No. 2, Jan. 1978, pp. 90–92.

*Primary Examiner*—John Lee
*Attorney, Agent, or Firm*—Fred Fisher

[57] ABSTRACT

A device for efficiently coupling electromagnetic radiation in the far-infrared and submillimeter spectral regions to surface plasmon waves comprises a prism constructed of a dielectric material, a first layer integrally formed on one face of the prism having an index of refraction which is less than the index of refraction of the prism, and a second overcoat layer formed integrally on the first layer and having an index of refraction which is greater than the index of refraction of the first layer.

13 Claims, 1 Drawing Figure

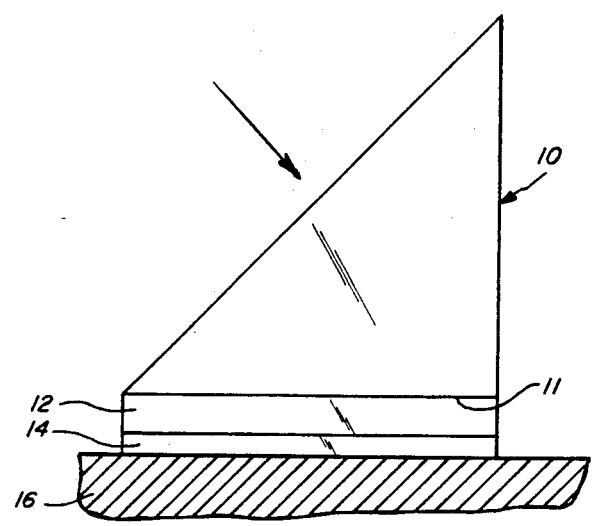

SURFACE PLASMON COUPLER

BACKGROUND OF THE INVENTION

The present invention relates in general to an optical device, and is concerned, more particularly, with an integral surface plasmon coupler for use in efficiently coupling between free space photons and surface plasmons in the far-infrared and submillimeter spectral regions.

It is well known that in the visible region of the electromagnetic spectrum it is possible to couple essentially all of the bulk electromagnetic wave incident to a metal surface into a surface electromagnetic wave (SEW) or surface plasmon wave within the metal. (For a detailed discussion of surface plasmons see, for example, E. Burstein et al., *J. Vac. Sci. Technol.*, Vol. 11, No. 6, pp. 1003–1019, 1974.)

However, as the wavelength of the incident radiation increases into the infrared region of the spectrum and beyond, efficient coupling between the incident radiation and the surface plasmon becomes more difficult. This is due to increasing delocalization of the electromagnetic field away from the interface and the corresponding decrease in the proportion of the field within the metal as wavelength increases.

Z. Schlesinger, et al, have discussed in *Solid State Commun.* Vol. 38, pp. 1035–1039, 1981, the phenomenon of coupling between far-infrared radiation and surface plasmons in germanium coated gold or lead surfaces. In a doctoral dissertation submitted to the University of Missouri at Rolla in 1975 and entitled, "Excitation of Surface Electromagnetic Waves at Microwave Frequencies Using Optical Techniques", M. Davarpanah has described the coupling of microwave radiation into a coated metal surface in devices which employ metal rods placed over the coating.

Up to the present time, a number of techniques have been experimented with, but generally resulting in poor coupling efficiency between the incident radiation and the surface plasmon wave. Some of the techniques involve the use of prisms, gratings and edge couplers. As a matter of fact, recently there has been substantial success with a dielectric overcoated grating coupler. See copending application Ser. No. 474,222 filed Mar. 11, 1983. However, one disadvantage with the grating type coupler is that the coupler must be formed into the metal surface on which the surface plasmon is to propagate.

As mentioned previously, prisms have been used in the past in an attempt to provide coupling of electromagnetic radiation with surface plasmon waves on a metal. In the known technique, a prism is supported by a support means so as to be spaced by an air gap from the metal substrate to which the coupling is to take place. This prior art prism arrangement provides for only marginal coupling and is generally difficult to set up, usually requiring some adjustment between the prism and the metal substrate.

OBJECTS AND SUMMARY OF THE INVENTION

It is therefore an object of this invention to provide a device which efficiently couples electromagnetic radiation in far-infrared and submillimeter regions of the spectrum with surface plasmon waves.

It is a further object of the present invention to provide a device in accordance with the preceding object and which is easily and inexpensively fabricated.

It is still another object of the present invention to provide a device in accordance with the preceding objects for coupling electromagnetic radiation into surface electromagnetic waves, and which device is portable and can be fabricated in compact size exhibiting high coupling efficiency.

It is still a further object of the present invention to provide a device for coupling electromagnetic radiation into surface electromagnetic waves in which the coupling occurs to a metal substrate and in which the prism has integral therewith means defining a gap which thus enables immediate set up of the coupler with no adjustment necessary.

It is still another object of the present invention to provide a device for coupling electromagnetic radiation into surface electromagnetic waves and in which, depending upon the profile of the incoming or desired outgoing free photon beam, the integral gap and/or integral overcoating thicknesses are readily profiled. This can be carried out in accordance with the present invention during the manufacture of the integral coupler.

To accomplish the foregoing and other objects and advantages of this invention, there is provided an integral surface plasmon coupler which comprises a prism of dielectric material which is transparent in the spectral region in which it is to be used. One face of the prism is coated with or has attached thereto, a layer of transparent material (at the operating frequency), which material has an index of refraction less than that of the index of refraction of the prism. Finally, an overcoat layer is attached to the layer of transparent material. This overcoat layer is also of transparent material (again at the operating frequency). The index of refraction of this final overcoat layer is greater than that of the intermediate layer. Component materials that may be used in the far-infrared and submillimeter regions are germanium or silicon for the prism, polyethylene as the intermediate layer, and germanium or silicon as the final overcoat layer.

BRIEF DESCRIPTION OF THE DRAWINGS

Numerous other objects, features and advantages of the invention should now become apparent upon a reading of the following detailed description, taken in conjunction with the accompanying drawing, in which there is illustrated an integral surface plasmon coupler which comprises a prism of dielectric material.

DETAILED DESCRIPTION

Integral surface plasmon wave coupling devices in accordance with the present invention are used for coupling electromagnetic radiation (EMR), particularly in the far-infrared and submillimeter microwave regions of the electromagnetic spectrum into surface plasmon waves in the device. As illustrated in the drawing, the integral surface plasmon coupler is comprised of a prism 10 constructed of a dielectric material which is transparent in the spectral region in which it is to be used. As illustrated in the drawing, one face 11 of the prism 10 is coated therewith or has attached thereto a layer 12 of a material that is transparent at the desired operating frequency. The gap layer 12 has an index of refraction which is less than that of the prism 10. After formation of the layer 12, there is coated or attached to this layer a further overcoat layer 14 also of a material that is transparent at the desired operating frequency. The index of refraction of this last overcoat layer 14 is greater than that of the intermediate layer 12 but need have no specific relation to the index of refraction of the prism 10. Each of the layers 12 and 14 may be deposited or formed by presently existing, well-known deposition or formation techniques. The prism 10 in a preferred embodiment may be constructed for use in the far-infrared and submillimeter spectral regions and may be made of either germanium or silicon. The intermediate layer may be formed of polyethylene and the overcoat layer, also, may be made of germanium or silicon.

The integral surface plasmon coupler of the present invention, as illustrated in the drawing, is shown disposed over and contacting a metal substrate 16. The arrangement illustrated in the drawing has at least two advantages over the prior art construction wherein a prism was previously supported spaced by an air gap from the substrate with the overcoat generally being provided on the metal substrate. It can be seen that by use of the integral coupler the gap layer 12 is fixed. This provides for ready and immediate set up of the coupler in relationship to the substrate 16. Furthermore, with the gap being fixed and predetermined, and integral with the prism, there is no necessity for adjustment of the gap as was the case with the previously used air gap structure.

A second advantage of the integral coupler of the present invention is in the fact that the overcoating is provided directly on the prism in the form of the overcoat layer 14. This thus eliminates the necessity for difficult coating techniques that sometimes have to be used when the overcoating is applied directly to the metal substrate. Furthermore, the integral coupler is also advantageous when using dielectric coated metals as the propagation media because thicker coatings are desirable at the coupler in that instance and the additional coating is provided directly on the coupler itself.

A further advantage of the present invention is concerned with the capability of the profiling of electromagnetic waves. It is advantageous in accordance with the present invention, depending upon the profile of the incoming or desired outgoing free photon beam, that the gap between the prism and the metal substrate and/or the coating thicknesses be profiled. This can be accomplished in accordance with the present invention during the manufacture of the integral coupler by control of the gap layer 12 and/or the last dielectric layer. This profiling may be carried out by means such as, for example, partial masking during the vacuum evaporation or alternatively one may use a contoured doctor blade. Once the proper gap is established this can then be readily reproduced. This form of profiling is carried out much more easily and readily than profiling carried out previously when the profiling occurred directly on the metal substrate. The thicknesses and profiles required are dependent on the indices of the materials and metal substrate and the operating frequency as well as the size of the free photon beam.

EXAMPLE

As indicated previously, the material of the dielectric prism may be germanium or silicon. The layer 12 as also indicated previously may be of a polyethylene. This may be deposited by a spin coating technique or also may be deposited mechanically by the use of a doctor blade. The thickness of the layer 12 is on the order of the penetration distance of the mode into the upper dielectric. This is dependent on the frequency of the mode, and ranges, in wavelength, from approximately 0.010 to 1.0 centimeter, taken from the far-infrared to the submillimeter portion of the spectrum. The overcoat layer 14 may also be of germanium or silicon. This layer may be deposited by a vapor deposition technique. The layer 14 may be on the order of 0.0001 to 0.01 centimeter thick depending on the frequency over the range described above.

While there have now been shown and described what are at present to be the preferred embodiments of the present invention, it should now be apparent to one skilled in the art that various changes and modifications may be made herein without departing from the scope of the invention as defined by the appended claims.

What is claimed is:

1. A device for the efficient coupling of electromagnetic radiation into surface plasmon waves, particularly in the far-infrared or submillimeter spectral regions, said device comprising; a prism having multiple faces and constructed of a dielectric material which is substantially transparent in the selected spectral region, a first layer integrally formed on one face of the prism also of a material substantially transparent in the selected spectral region and having an index of refraction which is less than the index of refraction of the prism, and a second overcoat layer integrally formed on said first layer also of a material substantially transparent in the selected spectral region and having an index of refraction which is greater than the index of refraction of the first layer.

2. A device in accordance with claim 1 wherein said prism comprises a material of a high dielectric constant.

3. A device in accordance with claim 2 wherein said prism material comprises germanium.

4. A device in accordance with claim 2 wherein said prism material comprises silicon.

5. A device in accordance with claim 1 wherein said first layer comprises a plastic material.

6. A device in accordance with claim 5 wherein said plastic material comprises polyethylene.

7. A device in accordance with claim 1 wherein said second layer comprises a material having a high dielectric constant.

8. A device in accordance with claim 7 wherein said second layer material comprises germanium.

9. A device in accordance with claim 7 wherein said second layer material comprises silicon.

10. A device in accordance with claim 1 wherein the thickness of said first layer is on the order of the penetration distance of an upper mode into the prism.

11. A device in accordance with claim 10 wherein the thickness of the first layer is dependent on the frequency of said mode, and ranges, in wavelength, from approximately 0.010 to 1.0 centimeter from the far-infrared to the submillimeter regions.

12. A device in accordance with claim 11 wherein said second layer has a thickness on the order of 0.0001 to 0.01 centimeter as a function of the frequency over the said wavelength range.

13. A method of fabricating a surface plasmon coupler to provide for efficient coupling of electromagnetic radiation into surface plasmon waves, particularly in the far-infrared and submillimeter spectral regions, said method comprising the steps of: providing a prism having multiple faces and constructed of a dielectric material which is substantially transparent in the selected spectral region, integrally forming a first layer on one face of the prism also of a material substantially transparent in the selected spectral region and having an index of refraction which is less than the index of refraction of the prism, and integrally overcoating a second layer on the first layer also of a material substantially transparent in the selected spectral region and having an index of refraction which is greater than the index of refraction of the first layer.

* * * * *